June 28, 1966  D. W. AMOS ETAL  3,258,082
CONTROL APPARATUS FOR AUTOMATICALLY STEERING A LAND VEHICLE
Filed July 8, 1964  3 Sheets-Sheet 1
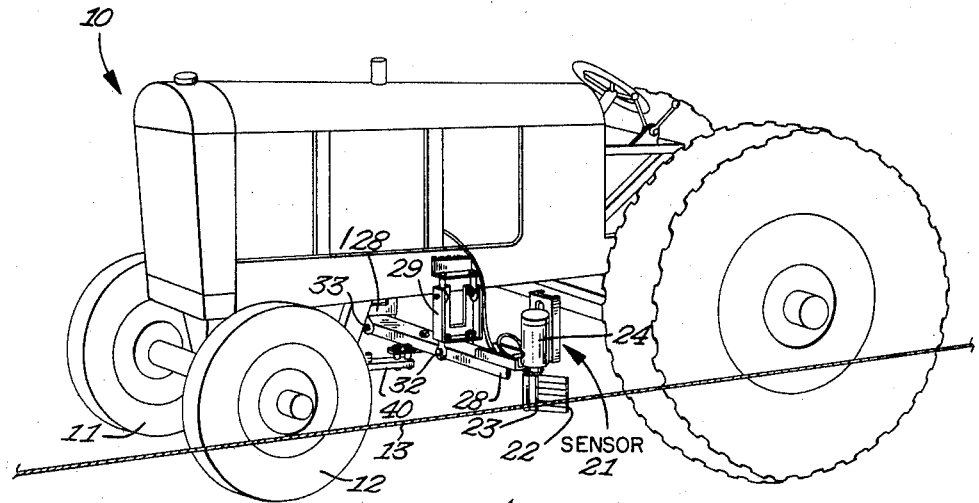
FIG 1
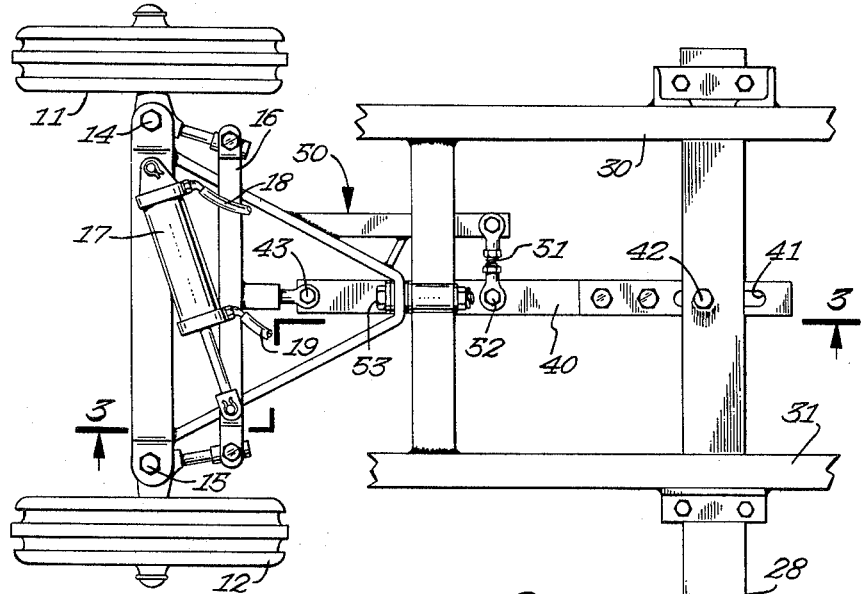
FIG 2
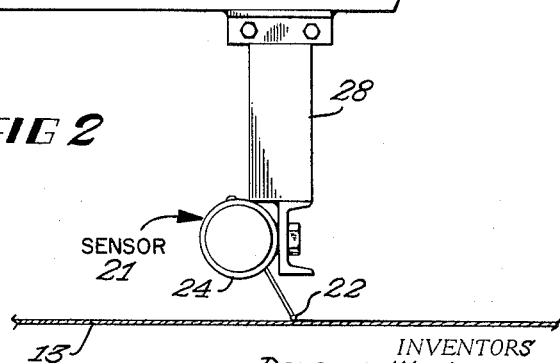
INVENTORS
DOUGLAS W. AMOS,
RICHARD W. HEISER
BY
Francis A. Sirr
ATTORNEY

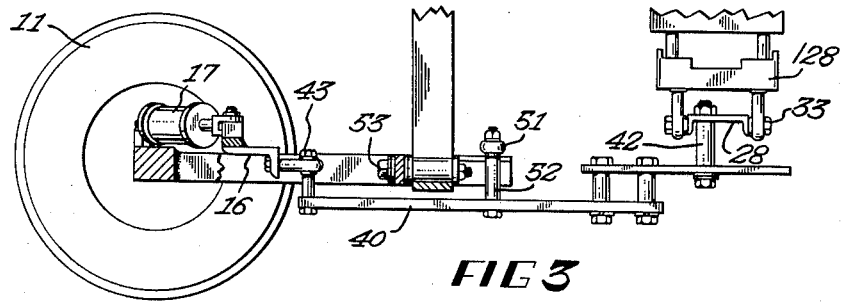
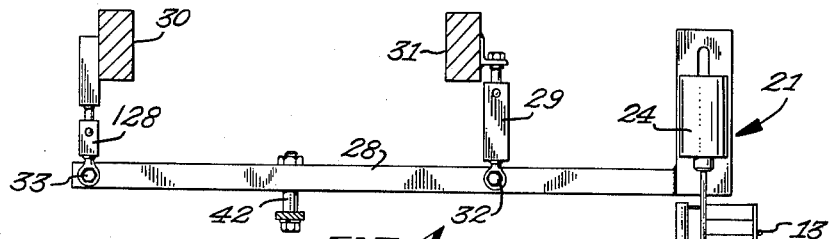
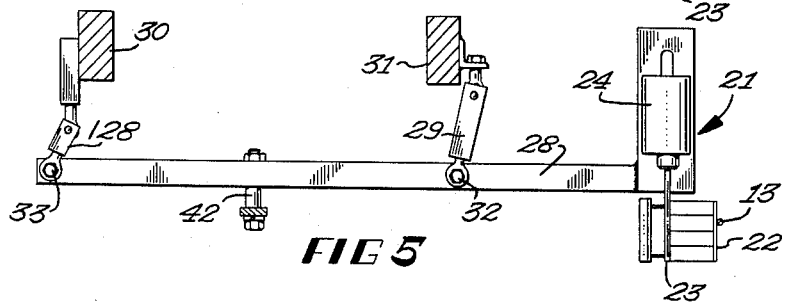
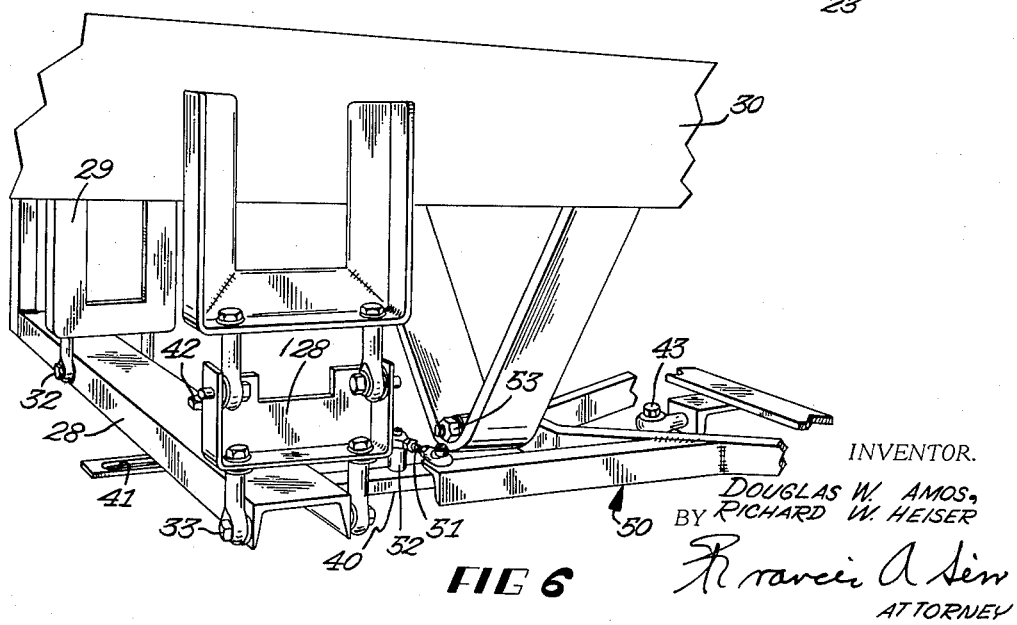
INVENTOR.
DOUGLAS W. AMOS,
BY RICHARD W. HEISER
ATTORNEY

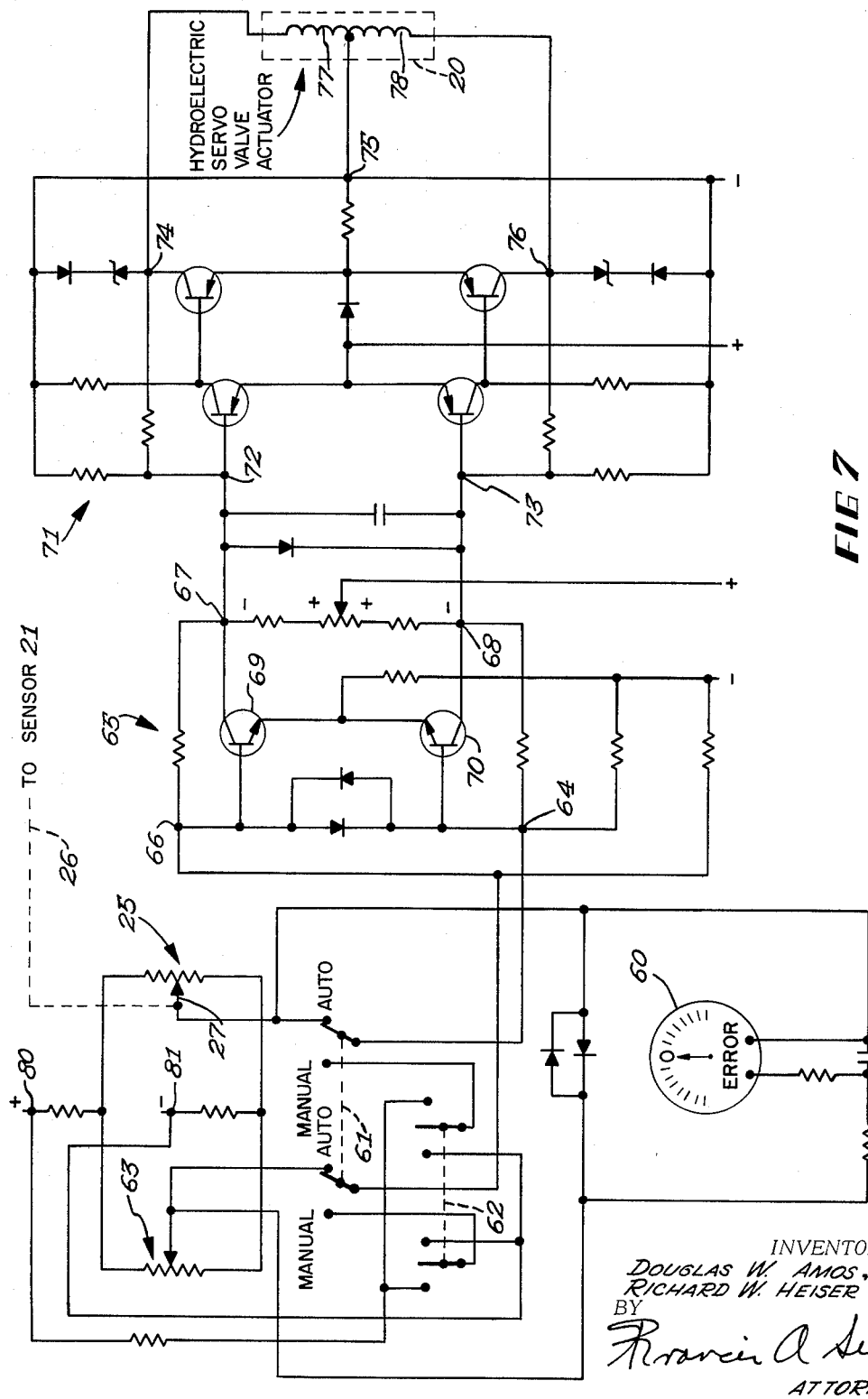

United States Patent Office 3,258,082
Patented June 28, 1966

3,258,082
CONTROL APPARATUS FOR AUTOMATICALLY
STEERING A LAND VEHICLE
Douglas W. Amos and Richard K. Heiser, Minneapolis, Minn., assignors to Honeywell Inc., Minneapolis, Minn., a corporation of Delaware
Filed July 8, 1964, Ser. No. 381,067
6 Claims. (Cl. 180—79.2)

Our invention is concerned with an improved control apparatus which is particularly adapted for use with a land based vehicle to automatically steer the vehicle from a land based steering datum, for example, a control wire which follows a path to be followed by the vehicle.

Our invention is of particular utility when utilized with a land based vehicle having a ground engaging wheel, the wheel being turnable about a generally vertical axis to cause a change in the heading direction of the vehicle and to thereby steer the vehicle. For accurate automatic steering control of such a vehicle, our invention utilizes a structure whereby a follower sensor is carried at one side of the vehicle and is moved horizontally and in a direction transverse to the vehicle to provide an anticipatory followup feedback to anticipate the turning of the vehicle which will be achieved by vertical turning of the ground engaging wheel, and by subsequent motion of the vehicle.

While we have chosen to use the term "wheel," we intend that this term encompass a track type support wheel or a conventional support wheel structure, or more broadly, a vehicle support which is modified to change the heading direction of the vehicle.

Specifically, we provide a follower sensor having a housing and a member which is movable with respect to this housing. This member engages the land based datum and senses a movement of the vehicle toward or away from the datum, translating this movement into movement of a potentiometer wiper, the potentiometer being contained within the housing. The electrical signal provided by this potentiometer controls, through electrohydraulic means, the modification of the vehicle support and causes a turning of the vehicle to restore the vehicle to a proper spacing to the steering datum. The structure of our invention translates this modification into horizontal and transverse movement of the follower sensor to anticipate the turning of the vehicle which will subsequently be achieved as the vehicle moves.

The structure of our invention moves the follower sensor in the direction of the turn and thus "satisfies" the electrical system prior to the actual restoration of the vehicle to its proper spacing from the datum. In this manner, we achieve accurate and reliable automatic steering, eliminating hunting and the like. Furthermore, as will be apparent, the structure of our invention translates only the turning modification of the vehicle support into movement of the sensor and causes movement of the sensor in a transverse horizontal direction, eliminating vertical movement of the sensor to thereby insure that the sensor will not "lose" its physical contact with the steering datum.

With these general considerations in mind, our invention will be apparent to those skilled in the art, upon reference to the following specification, claims and drawings, of which:

FIGURE 1 is a view of a land based vehicle carrying the structure of our invention and adapted to follow a land based steering datum, for example, a control wire, FIGURE 2 is a top view of a portion of the vehicle of FIGURE 1, showing a steering mechanism for the vehicle and showing the mechanism for controlling movement of the sensor, FIGURE 3 is a side view of a portion of the apparatus of FIGURE 2, taken along the section lines designated as 3—3, FIGURE 4 and 5 are alternate showings of the follower sensor, showing the manner in which the follower sensor is supported by pivot links of different lengths to achieve substantially uniform vertical positioning of the sensor as the sensor is moved in a horizontal direction, FIGURE 6 is a view showing structure including the short pivot link which is placed on the opposite side of the vehicle from that shown in FIGURE 1, and FIGURE 7 is a schematic showing of the electric apparatus controlled by the sensor, FIGURE 7 showing the potentiometer whose wiper is to be controlled by the sensor and showing an electrohydraulic servo valve actuator to control the hydraulic power ram which achieves the steering of the vehicle.

Referring to FIGURE 1, reference numeral 10 designates generally a land based vehicle in the form of a tractor having a pair of front ground engaging wheels 11 and 12. These wheels are adapted, in a conventional manner to turn about generally vertical axes 14 and 15 to achieve turning of the tractor. For purposes of simplicity, we have elected not to show an earth working tool carried by the tractor, which may, for example, consist of a trencher adapted to dig a trench as the tractor moves in a forward direction.

Reference numeral 13 designates a land based steering datum, for example a control wire which is positioned along the route to be followed by the tractor. In FIGURE 2 the wheels 11 and 12 are shown as turnable about the generally vertical axes 14 and 15, this turning movement being achieved by means of a tie bar 16. Tie bar 16 adapted to move in a horizontal direction, transverse to the longitudinal axis of the tractor, by means of a hydraulic power ram 17 having hydraulic fluid lines 18 and 19 adapted to be connected to a source of hydraulic fluid and to be controlled by the electrohydraulic servo valve acutator 20 which is shown in FIGURE 7.

Thus far, we have described a conventional tractor structure wherein movement of the piston of hydraulic ram 17 is controlled manually to achieve manual steering of the vehicle.

Referring again to FIGURE 1, reference numeral 21 designates generally a sensor having a counter balanced member 22 which is free to pivot about axis 23 and which engages datum 13. Sensor 21 includes a housing 24 and contained within this housing is a potentiometer, designated generally by means of reference numeral 25 of FIGURE 7. In FIGURE 7 the broken line 26 designates the connection of wiper 27 of potentiometer 25 to the member 22 of the sensor, this member moving as the spacing between housing 24 and datum 13 is varied.

Sensor 21 may be of the type shown in the copending application of Douglas W. Amos, Serial No. 189,124, filed April 20, 1962, now Patent No. 3,210,710.

Sensor 21 is supported on vehicle 10 by means of a beam 28 which is supported beneath the vehicle and extends in a generally transverse direction to the longitudinal axis of the vehicle. Beam 28 is connected to the vehicle by means of a pair of pivot links of unequal length. These pivot links can be seen clearly in FIGURES 4 and 5 wherein the short link, on the side of the vehicle opposite sensor 21, is designated by means of reference numeral 128, and the long link, on the side of the vehicle nearest sensor 21, is designated by reference numeral 29. The portions 30 and 31 of FIGURES 4 and 5 designate the opposite sides of the vehicle to which the upper ends of the pivot links are attached. The detailed construction of link 128 can be seen in FIGURE 6 and that of link 29 can be seen in FIGURE 1.

The construction of the links 128 and 29 which support beam 28 beneath vehicle 10 allows horizontal transverse movement of this beam such that horizontal movement of sensor 21 is achieved with a minimum amount of vertical movement of the sensor. As can be seen in FIGURE 1, excessive vertical movement of sensor 21 may cause its member 22 to become disengaged and to "lose" the datum 13.

In FIGURE 5, we have shown a condition wherein the wheels 11 and 12 of the vehicle have turned away from datum 13 and, as will be apparent, the structure of our invention then causes beam 28 to also move away from datum 13. This horizontal movement of beam 28, from the position shown in FIGURE 4, to the position shown in FIGURE 5, causes the pivot point 32 at the lower end of link 29 to move in an upward vertical direction. Also, the pivot point 33 at the lower end of link 128 moves in an upward vertical direction. However, because of the relatively short length of link 128, as compared to link 29, pivot point 33 moves a greater distance in an upward direction, and thus beam 28 tends to pivot as a unit about pivot point 32, causing the sensor end of the beam to lower as the entire beam moves in an upward direction due to operation of the pivot links 128 and 29. Thus, vertical movement of sensor 21 is minimized and the portion 22 of the sensor does not become physically disengaged from its contact with datum 13.

It is within the teachings of our invention to support beam 28 in a slide-guide type structure, such a structure likewise providing for horizontal transverse movement of the beam, without altering the vertical height of sensor 21.

In order to achieve horizontal transverse movement of beam 28 as the ground engaging wheels 11 and 12 of the vehicle rotate about the generally vertical axes 14 and 15, we provide a drive beam 40 which is connected at one end through an elongated slot 41 to a pin 42 carried by beam 28. The forward end of beam 40 is connected to tie bar 16 by means of a pivot structure 43, and a mid portion of beam 40 is connected to the stationary vehicle structure 50 by means of a pivot link 51 which is connected to beam 40 by means of a pivot pin 52. Thus, as can be seen in FIGURE 2, the turning of the vehicle away from datum 13 results in a movement of the tie bar 16 toward the datum, causing drive bar 40 to pivot generally about the pivot pin 52, and causing beam 28 to move in a horizontal direction away from the datum. This horizontal movement of the beam 28 away from the datum has the effect of moving the wiper 27 of potentiometer 25 in a direction to "satisfy" the electrical apparatus of FIGURE 7, prior to the time during which the new spacing of the vehicle away from datum 13 is achieved by movement of the vehicle.

As will be readily appreciated, vehicle 10 is adapted to traverse ground having uneven transverse slope, and thus the structure of the vehicle including the wheels 11 and 12 is adapted to pivot about a pivot point 53 as such uneven terrain is encountered. The structure of our invention aligns the drive bar 40 with the axis of pivot 53 to insure that only the turning movement of the vehicles 11 and 12 about the generally vertical axes 14 and 15 is translated into movement of beam 28.

It is also within the teachings of our invention to utilize alternate structure such as a hydraulic arrangement to control movement of beam 28 as movement of tie bar 16 is controlled. An essential feature of our invention is that beam 28 be controlled to anticipate the turning movement of the vehicle which will result from modification of the vehicle support, as by movement of tie bar 16.

Referring to FIGURE 7, we have shown an electronic amplifier structure having a bridge circuit, one portion of which consists of potentiometer 25 controlled by sensor 21. The structure of FIGURE 7 includes a unique feature whereby an error meter 60 is provided to monitor the operation of the automatic steering of the vehicle, and also includes a manual-automatic switch 61 which is manually controlled to selectively achieve automatic steering of the vehicle, or as an alternative when in the manual position, a manual jog switch 62 may be actuated to manually steer the vehicle. For purposes of simplicity, we have elected to show the D.C. voltage supply terminals for the bridge circuit, the input amplifier section, and the output amplifier section as separate voltage sources.

Error meter 60 is a null reading meter and is connected between the wiper of potentiometer 25 and to the wiper of a manually adjustable potentiometer 63. Thus, meter 60 provides an error reading when the potential levels of the wipers of potentiometers 25 and 63 are not equal. In the automatic position of switch 61, wiper 27 is connected to input terminal 64 of differential amplifier 65. The other input terminal 66 of this amplifier is connected through switch 61 to the wiper of potentiometer 63. The output of differential amplifier 65 exists at terminals 67 and 68. Amplifer 65 includes transistors 69 and 70 and the amplifier is constructed so that upon the wipers of potentiometers 25 and 63 being at the same potential level, no input voltage is applied to the input of amplifier 65 and no output voltage is derived across the output terminals 67 and 68. Should movement of sensor 21 away from datum 13 occur, then wiper 27 of potentiometer 25 moves in one direction, for example in an upward direction. If sensor 21 moves toward datum 13, then wiper 27 moves in a downward direction. These two movements of wiper 27 cause an output signal to be developed at terminals 67 and 68 of reversible D.C. polarity, depending upon the direction of movement of wiper 27.

Reference numeral 71 designates a snap acting electronic switch whose input terminals 72 and 73 are connected to the output terminals 67 and 68 respectively of differential amplifier 65. Electronic switch 71 has a first output existing at terminals 74 and 75 and a second output existing at terminals 75 and 76. The two operating coils 77 and 78 of servo valve actuator 20 are connected to the two pairs of output terminals respectively of electronic switch 71. Thus, coils 77 and 78 are selectively energized in accordance with the direction of movement of wiper 27. Servo valve actuator 20 is connected in a hydraulic system of a conventional form in which energization of one or the other of the coils 77 or 78 causes the control of hydraulic fluid to lines 18 and 19 of power ram 17 to position this ram, see FIGURE 2. Positioning of this ram causes movement of tie bar 16 and thereby causes movement of sensor 21 in a manner to reposition potentiometer wiper 27 to a position where the electronic system of FIGURE 7 is satisfied to thereby deenergize the energized one of the coils 77 and 78. With the coils 77 and 78 deenergized, power ram 17 is held in the new position, causing the vehicle to move in a different heading direction to correct the spacing of the vehicle to the datum 13.

When switch 61 is moved to the manual position, the manual jog switch 62 may be manually controlled to connect the input terminals 64 and 66 of differential amplifier 65 selectively to the positive and negative power supply input terminals 80 and 81 for the bridge circuit. Thus, jog switch 62 may be used, with switch 61 in the manual position, to manually steer the vehicle through the medium of the electronic network of FIGURE 7, which network is normally utilized to automatically control the steering of the vehicle.

Modifications of our invention will be apparent to those skilled in the art and it is thus intended that the scope of our invention be limited solely by the scope of the appended claims.

We claim as our invention:

1. An automatic steering apparatus for use with a land based vehicle having steering means with at least one ground engaging wheel which is controlled to change the heading direction of travel of the vehicle, and wherein a land based datum establishes the path to be automatically followed by the vehicle, the apparatus comprising:

a beam having a follower sensor mounted at one end thereof, said follower sensor including a movable control member which is adapted to engage the datum and to sense horizontal movement of said follower sensor away from a given horizontal position relative to the datum, control means controlled by said follower sensor and adapted to control the wheel under the command of said follower sensor, support means adapted to support said beam on the vehicle to facilitate transverse horizontal movement of said follower sensor relative to the vehicle while maintaining said follower sensor at a given vertical position relative to the vehicle, and means coupling said beam to the steering means to produce said transverse horizontal movement of said beam upon steering control of the wheel to anticipate the turning of the vehicle and to thus restore said given relative horizontal position of the follower sensor and datum.

2. Automatic steering control apparatus for use in controlling a land based vehicle from a land based steering datum, the vehicle having steering means controlling the heading direction of the vehicle by means of a ground engaging wheel to change the vehicle heading direction, the apparatus comprising:

a follower sensor having a body portion and a control member which is adapted to engage the datum, said control member being movable relative to said body portion to sense a change in the relative horizontal spacing of said body portion and said control member and to produce an output signal from said follower sensor which is indicative of said horizontal spacing, support means supporting said follower sensor on said vehicle at a given vertical position relative to the vehicle, said support means being movable in a horizontal direction generally normal to the vehicle heading direction and being constructed and arranged to maintain said follower sensor at said given vertical position when it is moved in said horizontal direction, drive means coupling said support means to the vehicle steering means to move said support means as the wheel is controlled, and to move said support means in the direction of the resulting change in the vehicle heading direction, and signal responsive means controlled by said follower sensor output signal and adapted to control the vehicle steering means in response thereto, said signal responsive means thus being effective to move said support means to a position to reduce the magnitude of said follower sensor output signal and thus anticipate the change in position of the vehicle which will result from movement of the vehicle in a changed heading direction.

3. Control apparatus for use with a land based vehicle having a steerable wheel, to automatically steer the vehicle from steering information derived from a land based datum, the apparatus comprising;

a follower sensor having a housing and a member which is adapted to engage the datum and to move relative to said housing in response to displacement of said housing relative to the datum and to provide an output indicative thereof, a beam supporting said housing at one end thereof and adapted to be movably attached to the vehicle to extend in a direction generally transverse the direction of travel of the vehicle, a first support link attached to said beam at a point intermediate its ends and adapted to be connected to the vehicle on the side adjacent the datum, a second support link of a length shorter than said first link attached to said beam at the end opposite said housing and adapted to be connected to the vehicle on the side opposite from the datum, said first and second links functioning upon transverse movement of said beam to maintain said housing at a substantially uniform horizontal height relative the datum, means adapted to couple said beam to the steerable wheel of the vehicle in a manner to produce transverse movement of said beam in the direction of the turn in the direction of the travel of the vehicle which is achieved by a turning of the steerable wheel, and means controlled by the output of said follower sensor and adapted to control the turning of the steerable wheel to maintain a given displacement of said housing relative to the datum.

4. Steering control apparatus for use with a land based vehicle having a ground engaging wheel which controls the direction of travel of the vehicle, to automatically steer the vehicle from steering information which is received from a generally horizontal extending ground based datum, the apparatus comprising;

a follower sensor having a potentiometer mounted within a housing and having movable means adapted to engage the datum and to cause movement of the wiper of said potentiometer in response to horizontal displacement of said housing in a direction generally normal to the datum, mechanical linkage means adapted to support said sensor to the side of the vehicle adjacent the datum and to translate the vertical axis turning movement of the ground engaging wheel into said horizontal displacement of the said housing in the direction of the turn of the vehicle to be caused thereby, to anticipate the horizontal displacement of the vehicle to be caused thereby, and electrical control means having an input connected to be controlled by the movement of said potentiometer wiper and having an output adapted to be connected to automatically control the ground engaging wheel so as to maintain a given sensor housing to datum displacement.

5. In combination;

a land based vehicle having a pair of transversely spaced ground engaging front wheels which are coupled by tie rod means for joint rotation about a pair of generally vertical axes and are supported to rotate about a longitudinal travel axis as the vehicle traverses ground having a slope which is generally normal to said travel axis, a land base steering datum to be followed by the vehicle, a follower sensor having a potentiometer within a housing and having means adapted to engage said datum and to control the position of the wiper of said potentiometer in accordance with the relative horizontal spacing of said housing and said datum in a direction generally normal to said datum and generally normal to said travel axis, a support beam having said housing mounted on one end thereof, a first pivot link connected to said support beam at a point intermediate the ends thereof and connected to the side of the vehicle adjacent said datum, a second pivot link of a length shorter than said first link connected to said support beam at the end thereof opposite said housing and connected to the side of the vehicle opposite said datum, said first and second pivot links thereby supporting said follower sensor to the side of the vehicle adjacent said datum and being effective to maintain said follower sensor at a given vertical height as said support beam moves in a direction generally normal to said datum, a drive beam pivotally connected at one end to said tie rod means, pivotally connected at the other end to said support beam, and pivotally connected at an intermediate point to said vehicle at a point on said vehicle which is aligned with said travel axis, said drive beam thereby being effective to translate only the rotation of said front wheels about said pair of vertical axes into movement of said support beam generally normal to said datum, to thus anticipate a change in the spacing of said vehicle and said datum to be achieved by said rotation of said front wheels, and by subsequent forward movement of said vehicle, and electrical control means having an input connected to be controlled by the wiper of said potentiometer and having an output connected to automatically control the rotation of said front wheels about said pair of vertical axes to thus maintain a given vehicle to datum spacing as said vehicle follows said datum.

6. Steering control apparatus for use with a land based vehicle having a ground engaging wheel which is turnable about a generally vertical axis to control the direction of travel of the vehicle, to automatically steer the vehicle from steering information which is received from a generally horizontal extending ground based datum, the apparatus comprising;

a follower sensor having a potentiometer mounted within a housing and having movable means adapted to engage the datum and to cause movement of the wiper of said potentiometer in response to horizontal displacement of said housing in a direction generally normal to the datum, mechanical linkage means adapted to support said sensor to the side of the vehicle adjacent the datum and to translate the vertical axis turning movement of the ground engaging wheel into said horizontal displacement of the said housing in the direction of the turn of the vehicle to be caused thereby, to anticipate the horizontal displacement of the vehicle to be caused thereby, electrical bridge circuit means including a reference potentiometer with a normally fixed wiper and including said follower sensor potentiometer, the resistance elements of said potentiometers being connected in parallel to a source of voltage, meter display means having an input connected between the wipers of said potentiometers to measure the voltage difference between said wipers, electrical control means having an input and having an output adapted to be connected to control the vertical axis turning movement of the ground engaging wheel, and manual switch means adapted in one position to connect the input of said control means between the wipers of said potentiometers to automatically maintain a given sensor housing to datum displacement as said meter display means indicates control error, and adapted in a second position to selectively connect the input of said control means to said source of voltage to manually steer the vehicle.

References Cited by the Examiner

UNITED STATES PATENTS

| | | | |
|---|---|---|---|
| 1,980,553 | 11/1934 | Salisbury | 180—79.1 |
| 2,509,914 | 5/1950 | Goodwine | 180—79.1 |
| 2,791,167 | 5/1957 | Lockmiller | 180—79.1 X |
| 2,981,355 | 4/1961 | Rabuse | 180—79.1 |
| 2,990,902 | 7/1961 | Cataldo | 180—79.2 |
| 3,038,544 | 6/1962 | Richey et al. | 180—79.1 X |
| 3,164,759 | 1/1965 | Connors et al. | |
| 3,181,441 | 5/1965 | Flom | 338—68 X |

KENNETH H. BETTS, *Primary Examiner.*